United States Patent [19]
Mulcahy et al.

[11] 3,729,214
[45] Apr. 24, 1973

[54] ADJUSTABLE FIFTH WHEEL MOUNTING

[75] Inventors: Harry William Mulcahy, Lansing, Ill.

[73] Assignee: AMSTED Industries Incorporated, Chicago, Ill.

[22] Filed: Aug. 27, 1971

[21] Appl. No.: 175,553

[52] U.S. Cl.....................................280/407
[51] Int. Cl. .................................B62d 53/06
[58] Field of Search.....................280/407, 80 B

[56] References Cited

UNITED STATES PATENTS

| | | |
|---|---|---|
| 2,860,891 | 11/1958 | Ramun....................280/407 |
| 3,170,716 | 2/1965 | Walther et al............280/407 |
| 3,369,825 | 2/1968 | Wolf.........................280/407 |
| 3,606,384 | 9/1971 | Fontaine et al...........280/407 |

*Primary Examiner*—Leo Friaglia
*Attorney*—Walter L. Schlegel, Jr. et al.

[57] ABSTRACT

A fifth wheel is slideably mounted on a truck frame so as to be longitudinally movable along the frame. Aligned horizontal openings in the frame and fifth wheel mounting are engaged by movable pins actuated by a single toggle linkage, which is in turn actuated by a power cylinder or a manually operated rod.

5 Claims, 3 Drawing Figures

Patented April 24, 1973
3,729,214
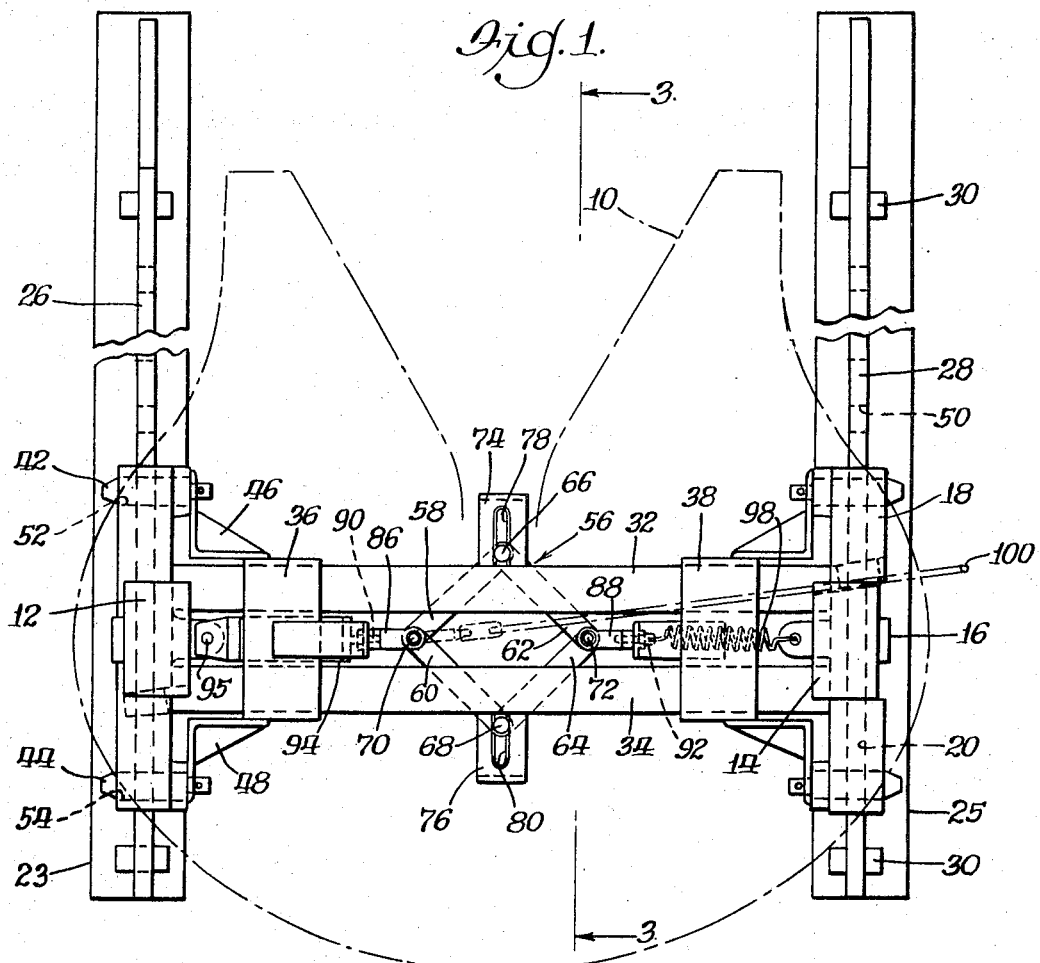
Fig. 1.
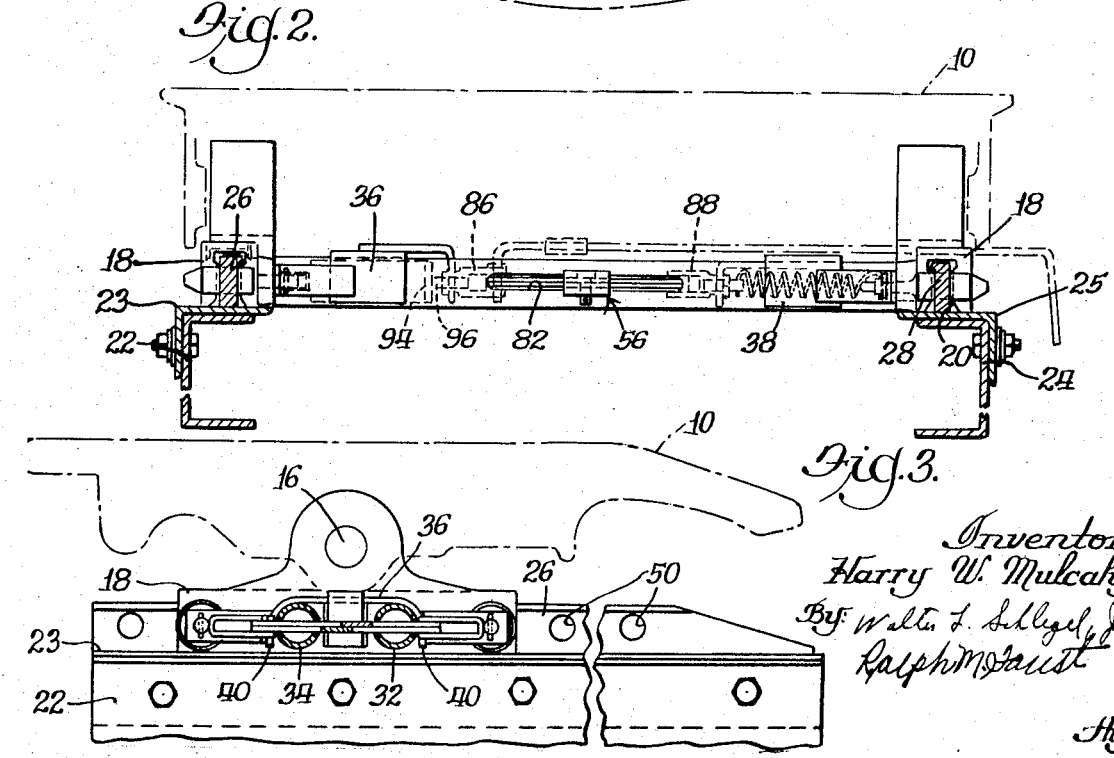
Fig. 2.
Fig. 3.
Inventor:
Harry W. Mulcahy
By Walter L. Schlegel, Jr.
Ralph M. Faust
Attys

ADJUSTABLE FIFTH WHEEL MOUNTING

This invention relates to adjustable fifth wheel mountings utilized for connecting a semi-trailer to a truck or tractor, wherein the fifth wheel is longitudinally adjustable in selective positions along the frame of the truck.

Numerous arrangements have been proposed to enable the longitudinal adjustment of the fifth wheel mounting on the frame of the truck. Adjustment of the fifth wheel assembly is primarily provided to better distribute the load between the leading and trailing vehicle.

For this purpose, a conventional arrangement includes a fifth wheel support slideably mounted upon spaced rails secured to the truck. Various types of locking means have been used to hold the fifth wheel mounting in the desired position on the rails. Illustrations of known locking mechanisms may be found in U.S. Pat. Nos. 2,860,891; 2,940,774; 2,903,275; 3,339,941; and 2,713,500.

An object of this invention is to provide an improved locking arrangement for a slideable fifth wheel mounting that requires few parts and is simple in construction.

Another object of this invention is to provide such a fifth wheel mounting that will securely lock into position after an adjustment has been made.

Other objects will become apparent from the following description and appended claims, taken in connection with the accompanying drawing, wherein:

FIG. 1 is a plan view of an adjustable fifth wheel mounting incorporating features of the presently described invention;

FIG. 2 is an end elevational view of the structure shown in FIG. 1; and

FIG. 3 is a sectional view taken along section line 3—3 of FIG. 1.

The adjustable fifth wheel mounting, in the preferred embodiment shown, generally comprises a fifth wheel, indicated in phantom outline at 10, pivotally mounted upon spaced trunnions 12 and 14 by means of pins 16 (FIG. 3). Each of the trunnions 12 and 14 includes an elongated base member 18 having a downwardly open, longitudinally extending groove 20.

The tractor (not shown) on which a fifth wheel is to be mounted includes a pair of spaced frame members 22 and 24 on which are mounted spaced angle members 23 and 25 upon which in turn are secured upstanding rail segments 26 and 28. The grooves 20 in the bases of the trunnions 12 and 14 overlie the respective rail segments 26 and 28, such that the trunnions are guided in a longitudinal path by the rails. Stop pins 30 may be utilized to prevent overtravel. In FIG. 2, it may be seen that the legs of the base of each trunnion 12 and 14 defining groove 20 therein slide on the respective angle members 23 and 25 to prevent excessive wear between the trunnions and their corresponding rails. The legs defining the groove 20 in each of the trunnions are also tapered to minimize friction between the trunnion and the frame member.

Preferably, a pair of spaced parallel supports 32 and 34 are secured between the trunnions 12 and 14, such that the trunnions and supports move longitudinally as a unit. A pair of spaced carriers 36 and 38 are slideably mounted for transverse movement on the supports 32 and 34, and have downwardly depending legs 40 indicated in FIG. 3 which straddle the extreme edges of the supports, in order to prevent longitudinal movement of the carriers. Each carrier 36 and 38 is secured to a pair of transverse horizontal pins 42 and 44 by means of respective angles 46 and 48. Each rail segment 26 and 28 has a plurality of transverse horizontal openings 50 therein, the openings being spaced such that they coincide with openings 52 and 54 in the base of each trunnion 12 and 14. The pins 42 and 44 pass through the respective openings 52 and 54 in each trunnion and through corresponding openings 50 in each rail.

Means are provided to move the pairs of pins associated with each carrier 36 and 38 transversely inwardly, such that the trunnions 12 and 14 are free to slide upon their respective rails 26 and 28. For this purpose, a collapsible parallelogram linkage, generally indicated at 56, is connected between the respective carriers 36 and 38, said parallelogram, or toggle, linkage being collapsible to retract the pins 42 and 44 out of the openings 50 in each rail 26 and 28. The toggle linkage 56 comprises four pivotally interconnected bars 58, 60, 62 and 64, the ends of adjacent bars being connected by respective pins 66, 68, 70 and 72. The linkage is arranged such that two of the opposed pins 66 and 68 lie along a plane substantially parallel to the vertical plane of the rails 26 and 28, and the other pins 70 and 72 lie along a transverse plane. Opposed guides 74 and 76 are secured to the respective supports 32 and 34 and extend longitudinally with respect thereto. Each guide 74 and 76 includes respective horizontal slots 78 and 80, which carry the respective pins 66 and 68 to limit movement of said pins in a longitudinal direction. It may also be seen that the toggle linkage 56 is carried within slots 82 within the respective supports 32 and 34.

The other pins of the linkage, 70 and 72, are connected to the respective carriers 36 and 38 by means of bifurcated arms 86 and 88 having threaded adjustments 90 and 92 therein to adjust the distance between the carriers and the toggle linkage. The cylinder end of a power cylinder 94 is pivotally connected as at 95, to one of the trunnions 12 and the end of the piston rod 96 is pivotally connected to the rod 86. A spring 98 under tension is connected between the rod 88 and the trunnion 14. The spring 98 serves the function of exerting a constant outward pressure on the locking pins 42 and 44 to prevent accidental disengagement of the pins during use and service.

In order to withdraw the pins simultaneously from both rail segments 26 and 28, the power cylinder 94 is actuated and urges the piston rod 96 in a transverse direction to collapse the linkage 56. It may be seen that the transverse pins 70 and 72 are moved toward one another, while the longitudinal pins 66 and 68 are moved away from one another within their respective guides 74 and 76. This, in turn, causes movement of the carriers 36 and 38 toward each other whereby the pins 42 and 44 are withdrawn from the rail openings 50. The actuating mechanism is adjusted such that complete collapse of the toggle linkage 56 will cause the pins 42 and 44 to be sufficiently withdrawn from the rail segments 26 and 28 to enable sliding of the trunnions upon the rails. The openings 50 in the rails 26 and 28 are sufficient in number to enable the desired number of longitudinal positions to be selected. After a new position has been selected, pressure on the cylinder 94 is released, and the spring 98 forces the pins 42 and 44 to be urged transversely outward to lock the trunnions into a new position.

Means other than the power cylinder 94 may be used to collapse the toggle linkage 56. For example, a pull rod 100 may be pivotally connected to either of the transverse pins 70 or 72 and may extend externally of the fifth wheel mechanism to enable manual operation.

I claim:

1. An adjustable fifth wheel mounting comprising a pair of parallel rails, a plurality of transverse horizontal openings in each rail, base members slideably supported on respective rails and each having an opening alignable with said openings in its supporting rail, a transverse support interconnecting said base members, a pair of carriers slideably mounted for transverse movement on said support, a lock pin carried by each carrier and adapted to normally extend through aligned openings of one base member and its supporting rail, a four-bar parallelogram linkage interconnecting said carriers, the bars of said linkage being pivotally connected by opposed pairs of pivot pins, guide means to accommodate movement of one pair of said pivot pins parallel to said rails, the other pair of said pivot pins being movable transversely of said rails, and means for collapsing said linkage to effect movement of said carriers toward each other whereby said lock pins are withdrawn from said rail openings.

2. An adjustable fifth wheel mounting according to claim 1 wherein said collapsing means includes actuating means interconnecting one of said other pair of pivot pins and one of said base members, and a spring interconnecting the opposed pivot pin and the other base member, said spring being operable for returning said linkage to its uncollapsed position.

3. An adjustable fifth wheel mounting according to claim 2, wherein said actuating means comprises a fluid operated cylinder.

4. An adjustable fifth wheel mounting according to claim 1, wherein said collapsing means includes a manually operated rod connected to one of said other pair of pivot pins.

5. An adjustable fifth wheel mounting comprising a pair of substantially parallel elongated rails, a plurality of transverse, substantially horizontal openings in each rail, base members slideably supported on respective rails and having openings alignable with the openings in the respective rails, a transverse support structure connected to said base members, a pair of lock pins adapted to extend through the aligned apertures of respective base members and their related supporting rails, means on said structure for guidably supporting the lock pins for movement toward and away from respective rails, a parallelogram linkage comprising four bars pivotally interconnected by two pair of opposed pivot pins, guide means on said structure for accommodating movement of one pair of said pivot pins substantially parallel to said rails, said other pair of pivot pins being moveable toward and away from respective rails, means operatively connecting each of said other pair of pivot pins to the adjacent lock pin for movement therewith, and means for collapsing said linkage to effect movement of said lock pins toward each other and out of engagement with the rail openings.

* * * * *